US007027468B2

(12) United States Patent
Krastev et al.

(10) Patent No.: US 7,027,468 B2
(45) Date of Patent: Apr. 11, 2006

(54) PHASE-INSENSITIVE RECOVERY OF CLOCK PULSES OF WAVELENGTH DIVISION MULTIPLEXED OPTICAL SIGNALS

(75) Inventors: Krassimir Krastev, Paris (FR); Dmitri V. Kuksenkov, Painted Post, NY (US); Shenping Li, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 242 days.

(21) Appl. No.: 10/667,932

(22) Filed: Sep. 22, 2003

(65) Prior Publication Data

US 2005/0063425 A1  Mar. 24, 2005

(51) Int. Cl.
*H01S 3/30*  (2006.01)
*H01S 3/83*  (2006.01)

(52) U.S. Cl. ............................................ 372/6; 372/94
(58) Field of Classification Search ..................... None
See application file for complete search history.

(56) References Cited

U.S. PATENT DOCUMENTS

| 5,548,433 A | 8/1996 | Smith ........................ 359/158 |
| 5,590,142 A | 12/1996 | Shan ........................... 372/18 |
| 5,604,618 A | 2/1997 | Mori et al. .................. 359/127 |
| 5,828,679 A | 10/1998 | Fisher ............................ 375/6 |
| 6,647,031 B1 * | 11/2003 | Delfyett et al. ............... 372/20 |
| 6,853,774 B1 * | 2/2005 | Watanabe .................... 385/39 |
| 2002/0071152 A1 * | 6/2002 | Blumenthal ................. 359/123 |

FOREIGN PATENT DOCUMENTS

WO      WO 03/101033       12/2003

OTHER PUBLICATIONS

"Fiber-Based Optical Parametric Amplifiers and Their Applications" Hansryd, et al IEEE Journal of Selected Topics in Quantum Electronics, vol. 8, No. 3 May/Jun. 2002.
"Wavelength-tunable all-optical clock recovery using a fiber-optic parametric oscillator" Yikai Su, et al Optics Communications Oct. 1, 2000 184 pp. 151-156.
"All-Optical Laser Synchronization and Clock Recovery based on Dynamic Pasrametric Gain Modulation" Lijun Wang, et al Dept. of Electrical and Computer Engineering Northwestern University.
"Theoretical and Experimental Study of Harmonically Modelocked Fiber Lasers for Optical Communication Systems" Moshe Horowitz, et al Journal of Lightwave Technology. vol. 18, No. 11, Nov. 2000 pp. 1565-1574.
"Tunable fiber-optic parametric oscillator" Darwin K. Serkland, et al Optics Letters, vol. 24, No. 2, Jan. 15, 1999 pp. 92-94.
"All-Optical Clock Recovery and Regeneration" Guifang Li, Optical Components and Transmission Systems, Proceedings of SPIE vol. 4906 (2002) pp. 193-199.

* cited by examiner

*Primary Examiner*—James Vannucci
(74) *Attorney, Agent, or Firm*—Ronald J. Paglierani

(57) ABSTRACT

An optically-pumped mode-locked fiber ring laser for optical clock recovery of multiple wavelength division multiplexed optical signals actively mode-locks a plurality of outputs of the laser as a plurality of recovered clocks for a plurality of the multiple wavelength division multiplexed optical signals. The laser cavity has a cavity length corresponding to an integer multiple of bit periods of at least one of the multiplexed optical signals for receiving a pre-amplified version of the plurality of wavelength division multiplexed optical signals to provide gain modulation through a phase-insensitive parametric amplification and recirculating a proportion of the output from the laser cavity back through the laser cavity for spatially mode-locking the output of the laser cavity as a recovered clock whereby the recovered optical clock each having a periodic train of optical pulses with a repetition rate corresponding to the clock rate of the corresponding multiplexed optical signal is generated by mode-locking of the optically-pumped laser produced by a spatial modulation of the phase-insensitive parametric gain produced by the pulsed nature of the wavelength division multiplexed optical signals. A nonlinear gain medium disposed in the cavity has a sufficiently large dispersion at all of the wavelengths corresponding to the multiple wavelength multiplexed optical signals for minimizing four-wave mixing crosstalk among the multiple wavelength multiplexed optical signals, among the recovered clocks, and between the plurality of multiple wavelength multiplexed optical signals and the recovered clocks. The gain medium is pumped by the plurality of pre-amplified multiplexed optical signals to provide efficient gain modulation through the phase-insensitive parametric amplification at a plurality of narrow wavelength bands, each of the plurality of narrow wavelength bands immediately adjacent to a wavelength of a corresponding optical signal and each of the plurality of narrow wavelength bands including a corresponding recovered optical clock wavelength, and each of the corresponding optical signals copropagating in the laser cavity through the nonlinear gain medium with the recovered optical clocks. A parametric optical amplifier or a Raman amplifier having an inhomogenously broadened gain amplifies the plurality of recovered clocks for compensating a portion of the cavity loss at all wavelengths of the plurality of recovered clocks. A wavelength selector passes the light at the plurality of wavelengths of the recovered clocks for recirculation in the laser cavity and preventing the light from the multiple wavelength division multiplexed optical signals and a plurality of idler waves generated by four wave mixing between the multiple wavelength division multiplexed optical signals and recovered optical clocks from recirculating in the laser cavity.

20 Claims, 5 Drawing Sheets

PHASE-INSENSITIVE RECOVERY OF CLOCK PULSES OF WAVELENGTH DIVISION MULTIPLEXED OPTICAL SIGNALS

BACKGROUND OF THE INVENTION

1. Field of the Invention

This invention is directed to recovering clock pulses of wavelength division multiplexed optical signals. In particular, it relates to simultaneous clock recovery of many wavelength division multiplexed optical signals.

2. Technical Background

As the capacity of wavelength division multiplexed (WDM) transmission systems increases in response to the increasing demand for communication, the maximum reach of each transmission system is diminished. Regenerators are therefore required at regular intervals along a transmission link in addition to any regenerators associated with network nodes where traffic routing takes place. It may be argued that regenerators are necessary within switching nodes to provide traffic routing and grooming functions, though this is not always the case when traffic on a given wavelength is routed straight through the node. However, the use of regenerators between nodes increases the network cost without contributing additional functionality. A cost-effective means of regenerating WDM signals is therefore required as an alternative to full WDM demultiplexing and opto-electronic regeneration. System manufacturers indicate that this is particularly necessary for 40 Gbit/s data rate systems with a target reach of 3000 km but a practical transmission limit around 1500 km.

A 3R regenerator (Reamplifying, Reshaping, Retiming) is a known example of an all-optical regenerator useful for future high-speed and high-capacity transparent optical networks. All-optical clock recovery is a major building block of the 3R all-optical regenerator because clock recovery is needed for its re-timing function. Many single channel approaches to all-optical clock recovery have been proposed and demonstrated. One single-channel clock recovery device used a fiber-optic parametric oscillator where the amplitude-modulated parametric gain for the clock signal is optically phase insensitive. Most clock recovery approaches are designed for one channel operation because for multi-channel all-optical clock recovery (MOCR), technical challenges are multiplied.

In a first MOCR approach, two-channel optical clock recovery was demonstrated using stimulated Brillouin scattering (SBS) in an optical fiber. However, due to the wavelength dependence of the Brillouin frequency shift, the total optical bandwidth effectively available to this clock recovery device is only about 3 nm. This limited spectral coverage is a severe drawback of the SBS-based MOCR. In a second approach, MOCR was achieved in an actively mode-locked fiber ring laser formed by a semiconductor optical amplifier array module integrated with two waveguide grating routers (AWGs) and an Er-doped fiber amplifier (EDFA). Several significant disadvantages exist with this approach. First, because of the homogeneous line broadening of the EDFA, the multi-channel operation of the fiber laser is inherently unstable. Second, in this device, each semiconductor optical amplifier (SOA) in the array module acts as an active mode-locker for only one corresponding channel. This increases the cost and complexity of the system. Third, no means to compensate the difference in path lengths for different channels within the SOA-AWG block were implemented, which is a requirement for multi-channel operation. Finally, overall speed of the device is still limited by the speed of the SOA response.

Therefore there is a need for an improved method and apparatus for use in all-optical clock recovery and signal regeneration, which can simultaneously process a plurality of WDM signals.

BRIEF SUMMARY OF THE INVENTION

According to a first aspect of the invention, an optically-pumped mode-locked fiber ring laser for optical clock recovery of multiple wavelength division multiplexed optical signals actively mode-locks a plurality of outputs of the laser as a plurality of recovered clocks for a plurality of the multiple wavelength division multiplexed optical signals. The laser cavity has a cavity length corresponding to an integer multiple of bit periods of at least one of the multiplexed optical signals for receiving a pre-amplified version of the plurality of wavelength division multiplexed optical signals to provide gain modulation through a phase-insensitive parametric amplification and recirculating a proportion of the output from the laser cavity back through the laser cavity for spatially mode-locking the output of the laser cavity as a recovered clock whereby the recovered optical clock each having a periodic train of optical pulses with a repetition rate corresponding to the clock rate of the corresponding multiplexed optical signal is generated by mode-locking of the optically-pumped laser produced by a spatial modulation of the phase-insensitive parametric gain produced by the pulsed nature of the wavelength division multiplexed optical signals. A nonlinear gain medium disposed in the cavity has a sufficiently large dispersion at all of the wavelengths corresponding to the multiple wavelength multiplexed optical signals for minimizing four-wave mixing crosstalk among the multiple wavelength multiplexed optical signals, among the recovered clocks, and between the plurality of multiple wavelength multiplexed optical signals and the recovered clocks. The gain medium is pumped by the plurality of pre-amplified multiplexed optical signals to provide efficient gain modulation through the phase-insensitive parametric amplification at a plurality of narrow wavelength bands, each of the plurality of narrow wavelength bands immediately adjacent to a wavelength of a corresponding optical signal and each of the plurality of narrow wavelength bands including a corresponding recovered optical clock wavelength, and each of the corresponding optical signals copropagating in the laser cavity through the nonlinear gain medium with the recovered optical clocks. A parametric optical amplifier or a Raman amplifier having an inhomogenously broadened gain amplifies the plurality of recovered clocks for compensating a portion of the cavity loss at all wavelengths of the plurality of recovered clocks. A wavelength selector passes the light at the plurality of wavelengths of the recovered clocks for recirculation in the laser cavity and preventing the light from the multiple wavelength division multiplexed optical signals and a plurality of idler waves generated by four wave mixing between the multiple wavelength division multiplexed optical signals and recovered optical clocks from recirculating in the laser cavity.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiments of the invention, and together with the description serve to explain the principles and operation of the invention.

DETAILED DESCRIPTION OF THE INVENTION

Figure 1:
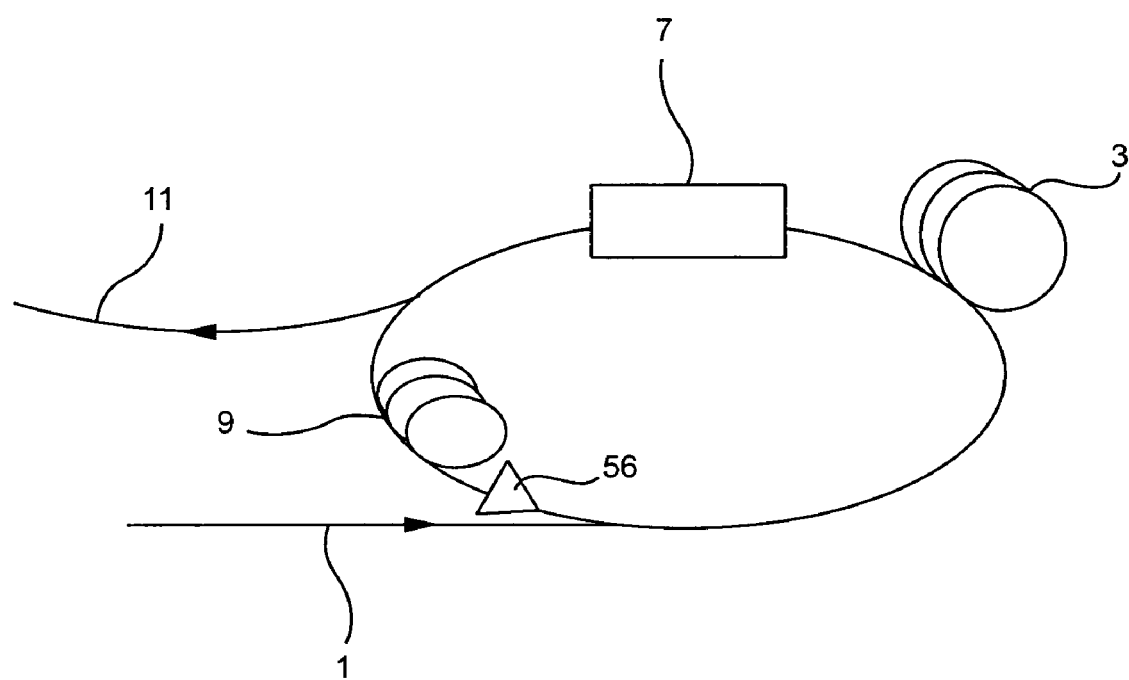
FIG. 1 is a schematic diagram of a phase insensitive parametric amplifier-based ring laser clock recovery circuit, in accordance with the teachings of the present invention.

A novel approach to the multi-channel all-optical clock recovery (MOCR) was proposed by A. Ellis in a U.S. patent application Ser. No. 10/153,957 filed Aug. 11, 2003 entitled "Recovery of Clock Pulses of Wavelength Division Multiplexed Optical Signals" assigned to the same assignee. This approach is based on a fiber-optic parametric oscillator, in which periodically modulated gain results from the phase-sensitive FWM process in the fiber. Phase-sensitive parametric amplification operation is inherently unstable due to the cavity length shifts caused by the environment such as temperature changes. To solve this problem, gratings were proposed as a passive method to stabilize the cavity length in the same patent application. Experimental results show that the gratings can indeed maintain the cavity length matched to the clock frequencies of the input signals. However, because the cavity gain modulation resulting from the FWM process is optical phase sensitive, the above method may still have a technical challenge to suppress the amplitude noise resulting from a random optical phase shift between the clock and input signal. Even with the use of a non-zero dispersion shifted fiber (NZ-DSF) for multi-channel operation, the potential problem of cavity length stability may still be present. The use of an Erbium Doped Fiber Amplifier (EDFA) to compensate for the cavity loss in a multi-channel case may lead to unstable operation due to the mode competition among the channels caused by homogeneously broadened gain of an EDFA.

Due to the fundamental nature of the parametric amplification process, if all three of the pump, signal and idler optical signals are present at the input of the fiber laser ring loop, phase-sensitive amplification only takes place if there is a specific phase relation between them. Hence, if the pump light, a signal, and the idler are all present at the input of a highly nonlinear dispersion shifted fiber (HNL-DSF1 or HNL-DSF2), the amplification process is phase-sensitive. For the phase-sensitive parametric amplifier, pump and signals are supplied from outside of the ring cavity, and idlers are circulated in the cavity, so all three are entering the nonlinear fiber at its input. Different clocks do not interact because their respective signals all have different phases. This is the advantage and the challenge of the design at the same time, because it assumes that optical signals coming from the transmission line have a well defined phase to begin with.

On the other hand, if the pump light and a signal are present at the input of a nonlinear fiber (for example a highly non-linear dispersion shifted fiber HNL-DSF1 or HNL-DSF2), the amplification process is phase-insensitive. Hence, if only the pump and signal optical signals are present in the phase-insensitive case, the phase of the optical wave does not matter, because the idler signal is generated with the proper phase, inside the amplifier automatically. In a phase-insensitive parametric amplifier cavity, only signals (which serve as a parametric pump) and clocks that are recirculated in the cavity are entering the nonlinear fiber at its input. Therefore the optical phase relation between the signals and the clocks does not matter. Idlers are still generated in the parametric process, but the idlers are thrown away by the filters (such as gratings), so that the idlers can not recirculate or get to the nonlinear fiber input.

This phase insensitive approach provides an advantage in terms of not needing to watch the phase of the optical waves. However, the advantage of the phase-sensitive design is eliminated and now signals can interact. Therefore, the other fundamental property of parametric amplification is implemented—if the pump wavelength is designed as a far longer wavelength than the dispersion zero (if the medium has finite positive dispersion) of the highly nonlinear dispersion shifted fiber (HNL-DSF1) than the parametric gain band is very narrow. The parametric gain would then be located only immediately left and right of the pump in spectrum. Thus, the medium (fiber) is selected with the appropriate design, and the inputs are separated far enough in wavelength, such that each one will amplify and modulate its own clock right next to it, and never touch other signals and clocks that are far away.

Unfortunately, when the parametric gain is narrow it is also small. Thus, there is a preference for a second amplifier to boost the gain of all the clocks together almost to the level of the lasing threshold of the cavity. But that second amplifier amplifies all clocks together, so cross-gain modulation need to be minimized. Hence, the second amplifier is preferably inhomogeneously broadened.

Referring to FIG. 1, for achieving stable multi-channel all-optical clock recovery in a fiber-optic parametric oscillator, the phase-insensitive clock recovery circuit is illustrated. A signal input fiber 1 is coupled to a length of around 500 m of dispersion-shifted nonlinear medium as an example of a highly non-linear dispersion-shifted fiber 3 by a coupler, such as a wavelength division multiplexer (not shown). In general, the starting point for the loop or cavity can be anywhere in a ring cavity. But, in this laser cavity example, the starting point is the input of the nonlinear fiber (HNL-DSF1) 3, because the generation of the clock signal starts there.

The output from the dispersion-shifted fiber 3 is fed to a band-pass filter 7, and the output from the band-pass filter branches into two paths. A first path from the band-pass filter 7 is coupled to an adjustable fiber delay line 9 comprising dispersion-compensating fiber having the opposite dispersion characteristics to those of the dispersion-shifted fiber 3. After the fiber delay line 9, the first path is amplified by an optical amplifier 56 with inhomogenously broadened gain, and then is coupled back to the signal input fiber 1 to complete an active mode-locked fiber ring laser configuration or cavity. The second path from the band-pass filter 7 comprises a clock output fiber 11.

According to the teachings of the present invention, a parametric optical amplifier 56 is disposed in the cavity. The optical amplifier 56 has an inhomogenously broadened gain for amplifying a plurality of recovered clocks for compensating a portion of the cavity loss at all wavelengths of the recovered clocks. The amplifier 56 eliminates mode competition among channels by being inhomogeneously gain-broadened and is preferably broadband to compensate for the cavity loss. Thus, the amplifier 56 achieves stable all-optical clock recovery for more than two optical channels in a single device, with the total number of channels and spectral span limited only by the optical gain bandwidth of the amplifier 56 used to compensate cavity loss. 1 Optical amplifier 56 can either be a parametric or Raman amplifier.

Figure 2:
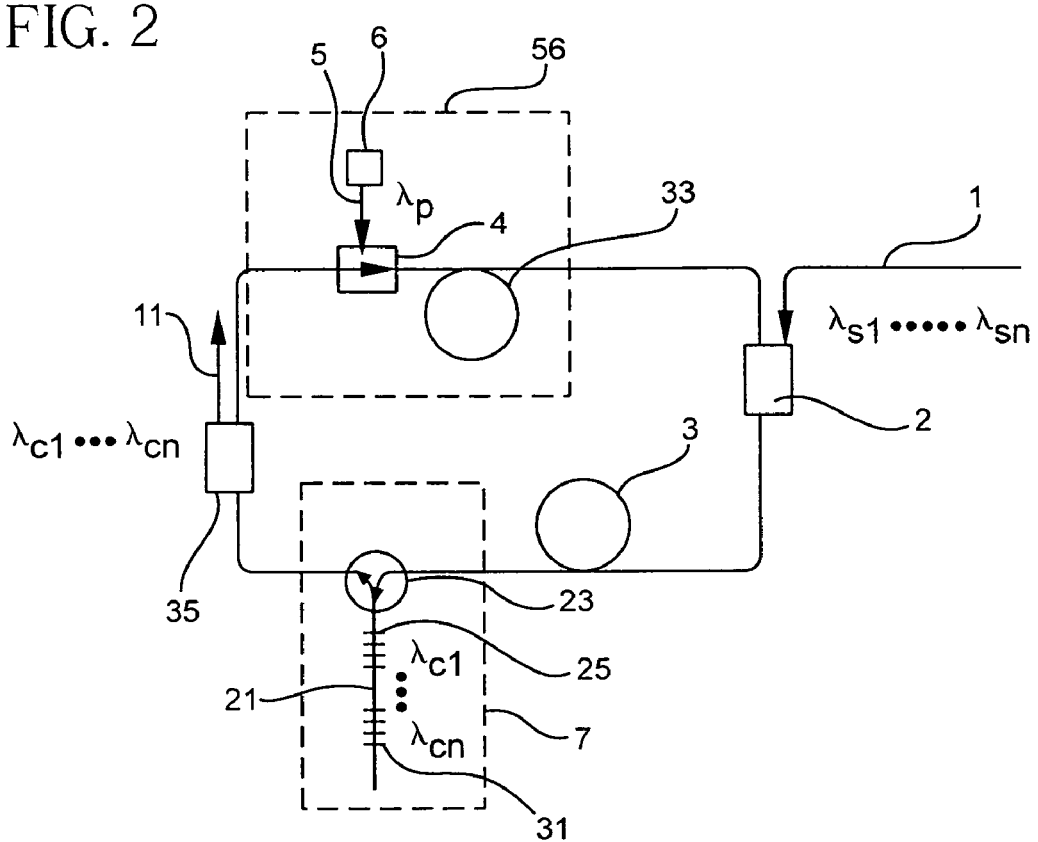
FIG. 2 is a schematic diagram of the optical amplifier 56 of FIG. 1, implemented by a second highly nonlinear dispersion shifted fiber 33.

Referring to FIG. 2, a phase-insensitive cavity loop is shown where the band-pass filter 7 of FIG. 1 is substituted by an optical circulator 23 and a grating structure, such as a plurality of chirped fiber Bragg gratings (CFBG) including gratings 25 through 31 in an optical branch 21. Furthermore, the optical amplifier 56 of FIG. 1 is substituted by a wavelength division multiplexer 4 coupling a pump light input 5 at a wavelength of λp to a second highly nonlinear dispersion shifted fiber 33.

In this exemplary configuration of the multi-channel clock recovery device with parametric amplifier, the system consists of two optical couplers 2 and 35, two sections of highly nonlinear dispersion shifted fiber or gain mediums 3 and 33, one optical circulator 23, a number of chirped fiber Bragg gratings (equal to the number of channels) such as 25, 27, 29, and 31 for four multiplexed channels, one wavelength division (add) multiplexer 5, and one continuous wave (CW) pump laser source 6.

For the HNL-DSF2 or gain medium 33 (used for the parametric amplifier), the zero dispersion of the nonlinear fiber should be around the middle of the channel bandwidth which is also around the pump wavelength of the parametric amplifier. For example, if the device works for C band (1525 nm~1565 nm). The zero dispersion of the nonlinear fiber 33 should be around 1545 nm.

Figure 3:
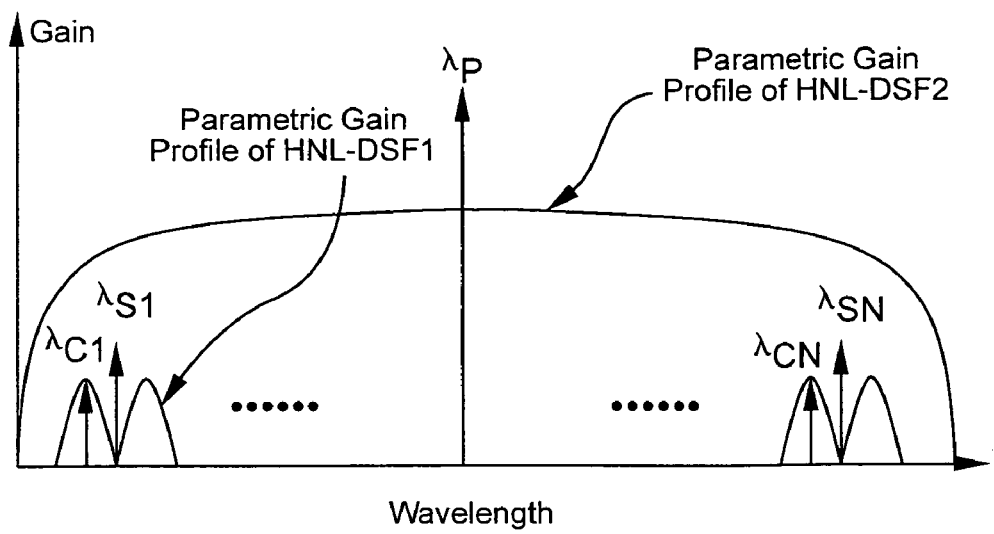
FIG. 3 is a graph of the gain profiles of the cavity of FIG. 2.

Referring to FIG. 3, the operation principle of FIG. 2 is illustrated showing gain profiles where $\lambda_{s1}$ ... $\lambda_{sn}$ are respectively the wavelengths of input channels 1 ... n. $\lambda_{s1}$ ... $\lambda_{sn}$ are the wavelengths of recovered clocks for respectively channels 1 ... n. The center wavelength of the $i_{th}$ CFBG (or the $i_{th}$ channel clock wavelength $\lambda_{ci}$) is set at one of the parametric gain peaks ($\lambda_{ci}$) of the nonlinear fiber (HNL-DSF1) 3 provided by the $i_{th}$ input channel signal ($\lambda_{si}$). As will be discussed later, by properly designing the nonlinear fiber or properly choosing the fiber length, the gain produced by each channel signal will be separated in the wavelength domain. Therefore, the gain of each clock signal is independently modulated by the corresponding input signals. To compensate for the cavity loss, the parametric amplifier 56, consisting of a section of highly-nonlinear dispersion shifted fiber (HNL-DSF2) 33 is pumped by a high power CW light 6 on a pump input 5. When the pump light power is much larger than the power of the clock signals, the pump depletion can be neglected and the amplifier 56 works as if its gain was inhomogeneously broadened. Unlike a standard EDFA, the mode competition produced by the amplifier 56 is eliminated. When the CFBG's are properly designed, as discussed later, each channel clock can automatically adjust its wavelength to allow the round-trip delay be equal to a multiple of the corresponding input signal bit period. Thus, a multi-channel actively mode-locked ring laser is formed through spatial modulation, where the signal gain of each resonant (clock) channel is strongly spatially modulated by only corresponding incoming channel data, and the clock signal is independently extracted from each incoming data stream.

The parametric amplifier 56, implemented by the highly nonlinear dispersion shifted fiber (HNL-DSF2) 33 is used to compensate the cavity loss. In general, the CW pump light power at the pump input 5 is much larger than the power of the recovered clock signals. Thus, the pump depletion can be neglected. The fiber 33 thus works as an inhomogeneously gain-broadened amplifier. Therefore, unlike a standard EDFA, the mode competition produced by the parametric amplifier 56 is eliminated.

To get a wide gain bandwidth which can fully cover all clock channels, the (HNL-DSF2) fiber or gain medium 33 has to be designed with a very low dispersion slope and dispersion zero wavelength as close as possible to the desired pump wavelength ($\lambda_p$). To avoid unwanted channel crosstalk, in general it is desirable to place the pump wavelength outside of the wavelength band occupied by the channel and clock signals. It is also possible to have the pump wavelength in the middle of channel signals wavelength range, as shown in FIG. 3. In this case, the subset of channels for clock recovery and pump wavelength position have to be chosen carefully so that no idler wavelength generated by parametric amplification coincides with the spectral position of another signal or clock.

The gain of the parametric amplifier 56 should be set at a level that compensates most of the cavity loss, but below the threshold of CW oscillation for all clock channels. Additional gain-flattening filters (not shown) might be required.

Figure 6:
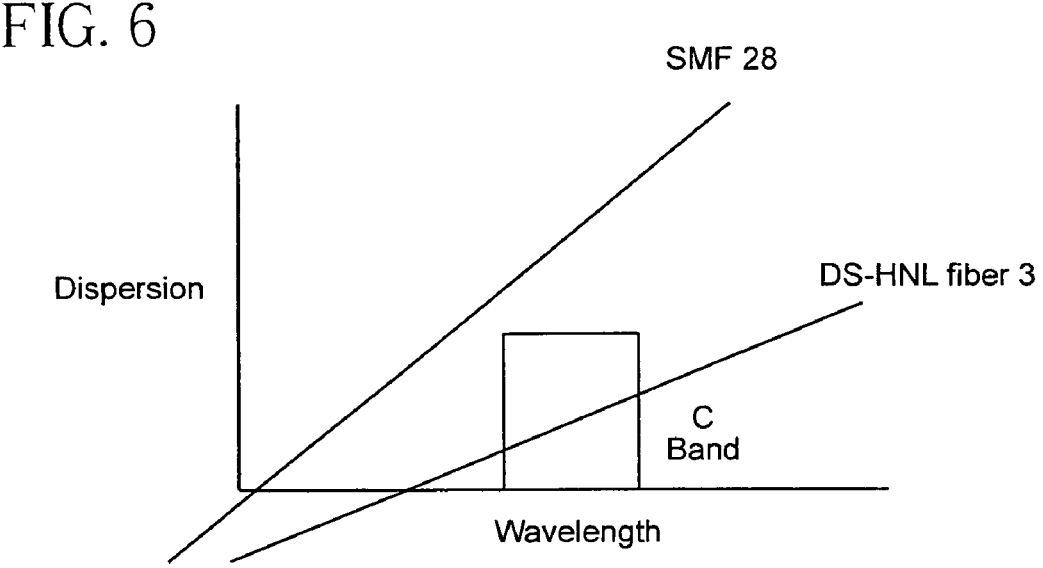
FIG. 6 is a graph of dispersion as a function of wavelength for the highly nonlinear dispersion shifted fiber 3 of FIGS. 1, 2, or 4, according to the invention, as compared to the single mode fiber 28 which could be used as the length of the fiber for the cavity.
Figure 7:
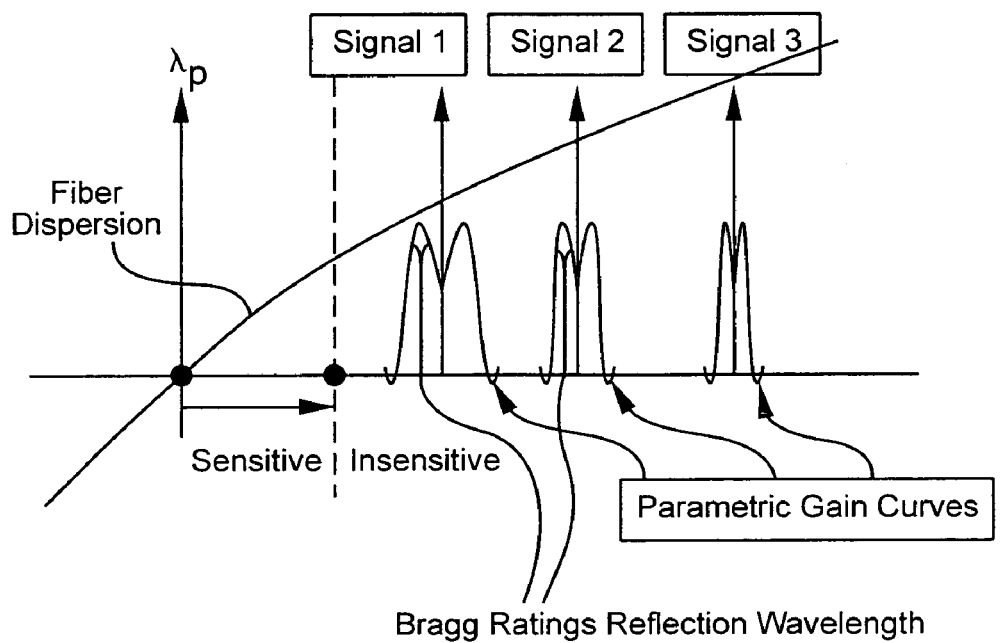
FIG. 7 is a design chart for the fiber 3 of FIG. 1 where the parametric gain curve is graphed as a function of the position of the signal channel with respect to the zero-dispersion wavelength.

The control of the parametric gain bandwidth of the nonlinear fiber (HLF-DFS1) or gain medium 3 is next illustrated by FIGS. 6 and 7. Different from a phase-sensitive design, the clock recovery of the present invention uses the optical phase insensitive parametric amplification to provide the gain modulation required for active mode-locking. An extremely important advantage of phase insensitivity is that no interferometric stabilization of cavity length is required, and no restrictions are placed on the phase noise content of the input signals. However, a narrowband amplification at each clock wavelength must be realized to allow for a multi-channel operation. To avoid the cross-talk between neighboring clock channels due to overlap of the parametric gain bandwidths, the nonlinear fiber (HLD-DSF1) or gain medium 3 should be properly designed or (and) the length of fiber should be properly chosen.

The parametric gain bandwidth can be approximately expressed as $$\Delta\Omega_A = \frac{\pi}{|\beta_2|\Omega_s L} \quad (1)$$

where L is fiber length, $\beta_2$ is the dispersion parameter, $\Omega_s$ is the frequency shift between the pump and signal waves corresponding to the phase-matching condition. Equation (1) indicates that the gain bandwidth decreases with the increase of the dispersion parameter as well as the fiber length. Therefore, two methods can be used to control the parametric gain bandwidth of HNL-DSF1 or gain medium 3. First, the gain bandwidth is controlled by properly designing the zero dispersion point and dispersion slope of the fiber. Second, it can be easily adjusted by just changing the fiber length. Furthermore, a combination of the two methods may also be used. However, finite fiber dispersion will produce walk-off between the clock signal and input signal, which will effectively reduce modulation required for the device operation and cause the clock pulses being asymmetric. Therefore, minimum allowable channel spacing to minimize crosstalk and maximum allowable walk-off should be considered simultaneously. The walk-off should be limited within not more than 50% of the input signal pulse width.

Cavity length stabilization by using CFBG's, including 25 and 31, improves the performance of the clock recovery system. In a passive cavity length stabilization structure, the insertion of the CFBG's into the cavity enables the laser to maintain synchronism with an external signal bit rate automatically. Since the grating is chirped, the effective reflection plane position depends on the wavelength. As a result, a small change in the cavity length or the group velocity of light can be compensated by a small shift of the lasing wavelength.

For a particular bit rate f the minimum CFBG length needed to passively stabilize the laser operation can be estimated from the following inequality:

$$\frac{n f \Delta\lambda}{c}\left(\frac{2}{D_g} - cDL_c\right) \geq 1 \quad (2)$$

where n is the effective refractive index, c is the velocity of light, $\Delta\lambda$ is the total chirp of the CFBG, D is the average dispersion parameter of the cavity fiber, $L_c$ is the laser cavity length and $D_g$ is the grating dispersion, approximately given by $$D_g = \frac{\Delta\lambda}{L_g} \quad (3)$$

where $L_g$ is the length of the grating.

When a different cavity length is desired for different channels, each CFBG 25 defines a unique laser cavity length for its own recovered clock signal. This means that for a multi-channel operation, there is no need to have a total cavity dispersion exactly equal to zero.

For spectral selection, CFBG's 25 and 31 combine the functions of reflection and spectral filtering. Each CFBG 25 or 31 reflects a corresponding restored channel clock signal and passes through light at all other wavelengths, including the CW pump 6, ASE, FWM terms etc., which eventually are leaving the laser cavity. Individual reflection peaks can be easily adjusted by straining or temperature-tuning corresponding CFBG's 25 or 31.

For a phase-insensitive loop with a Raman amplifier, two configurations are illustrated. The first one is the same as the loop configuration shown in FIG. 2, which could also be implemented as a Sagnac laser configuration, except that the CW pump light of HNL-DSF2 medium 33 is pumped at a Raman pump wavelength of FIG. 5.

Figure 4:
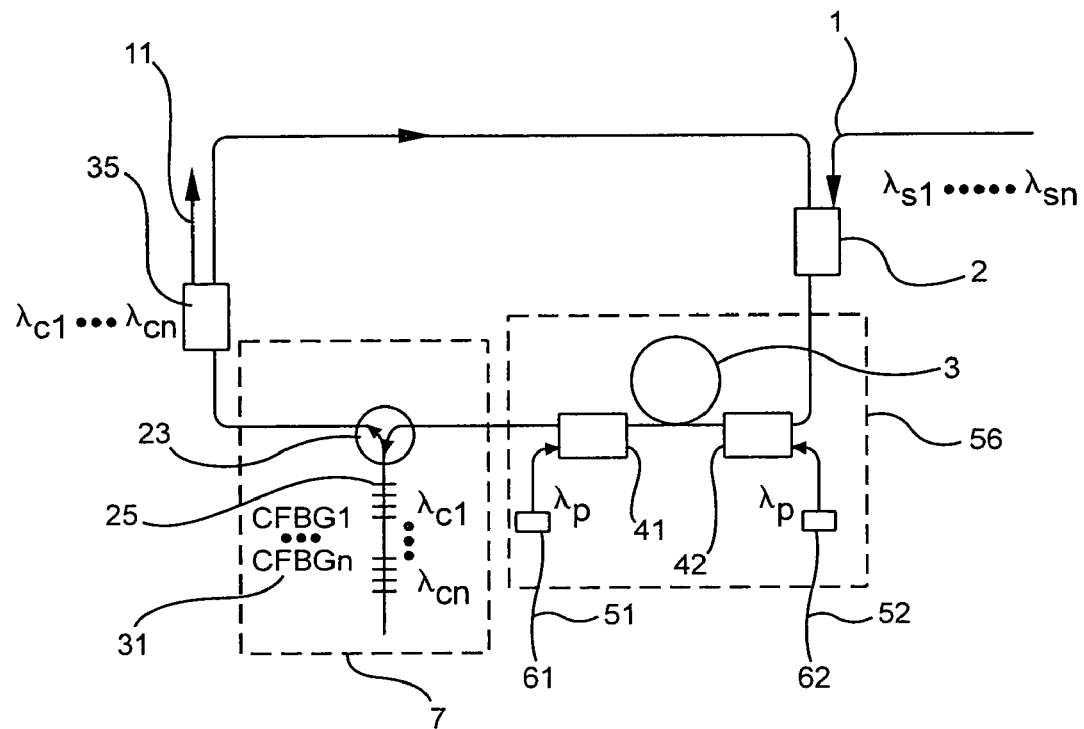
FIG. 4 is a schematic diagram of the optical amplifier 56 of FIG. 1, implemented as a Raman amplifier.
Figure 5:
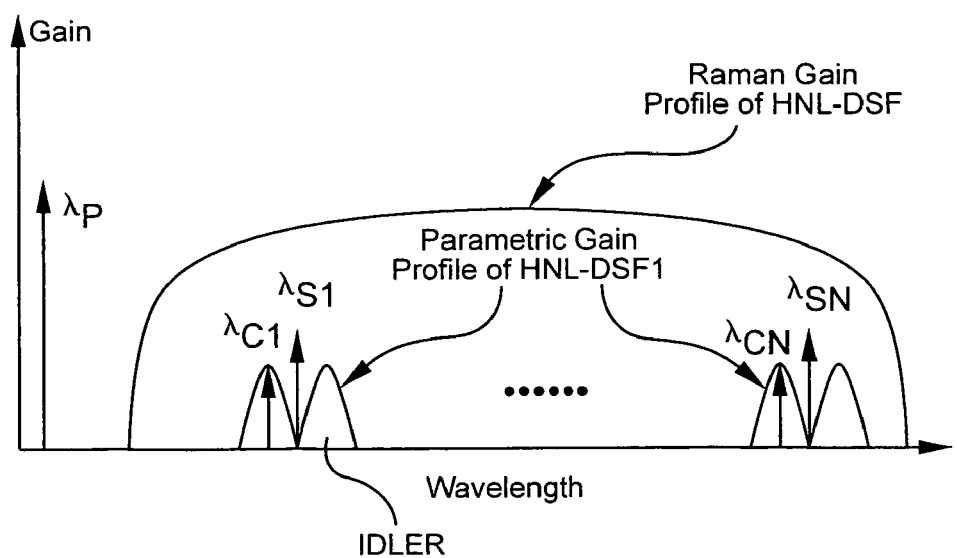
FIG. 5 is a graph of the gain profiles of the cavity of FIG. 4.

Referring to FIG. 4, the second Raman amplifier configuration is shown. The parametric amplifier 56 of FIG. 2 is simultaneously used as a Raman amplifier by adding the two Raman pump sources, coupled by two separate couplers, such as wavelength division multiplexers 41 and 42, and the gain medium 3 which could be a holey fiber, a photonic band gap fiber, a Raman fiber, or any other type of highly nonlinear dispersion shifted fiber. As shown in FIG. 5, when the wavelength of the Raman pump light is properly chosen, the Raman gain bandwidth can fully cover the clock signals of all channels. So, the same nonlinear fiber (HNL-DSF) or gain medium 3 serves as the nonlinear medium for both parametric gain modulation and Raman amplification. In general, the CW pump light power is much larger than the power of the clock signals, and therefore the pump depletion can be neglected. In addition, the Raman amplifier gain is at least in part inhomogeneously broadened. Therefore, unlike when using a standard EDFA, the mode competition produced by the amplifier is eliminated. All other design issues are the same as discussed with FIGS. 2 and 3.

Hence, the present novel clock recovery device is especially designed to solve the challenges of instabilities coming from both mode competition among the channels and cavity length shift for multi-channel operation. First, to eliminate mode competition among channels, the broadband parametric optical amplifier 56 implemented by a second fiber 33 of FIG. 2, or the broadband parametric optical amplifier 56 is replaced by a Raman optical amplifier with a Raman fiber, or alternatively, a Raman optical amplifier which uses the same highly nonlinear dispersion shift fiber 3 by adding the two pump sources 61 and 62 is used to compensate for the cavity loss.

Using phase-insensitive parametric gain, no interferometric cavity stabilization is required, and no restrictions are placed on the phase noise of the incoming signals. Compared with semiconductor based clock extractors, the phase insensitive loop can work at much higher bite rates due to the extremely fast response time of fiber nonlinearities.

Because the phase insensitive design employs a number of chirped fiber Bragg gratings (CFBG's), such as gratings 25 and 31 in the laser cavity to automatically compensate environmental cavity length change by the small shift of the lasing wavelength, passive locking of the output pulse repetition rate to any input clock frequency is enabled. Since the parametric gain is optically phase insensitive, this phase insensitive design is also free from the noise caused by a random signal phase variation.

Referring to FIG. 6, the typical dispersion curve of the dispersion shifted highly nonlinear fiber 3 is depicted. The highly nonlinear dispersion shifted fiber 3 is designed to have a zero dispersion wavelength outside the C band (1535 nm–1570 nm) and preferably on the shorter wavelength side. The optical effect used with the fiber 3 is the four-wave-mixing based harmonic mode locking of a parametric laser in a ring cavity configuration of FIGS. 1, 2, or 4. The parametric gain manifests itself when a pump and a signal are present at the input of the fiber and in particular on the input of a dispersion shifted fiber 3. Regardless of phase sensitive or phase insensitive, the efficiency of the parametric gain is related to the phase matching conditions between the signal and the pump and to the nonlinear coefficient of the fiber. The parametric gain bandwidth depends on the interplay between the phase mismatch and the nonlinear effect induced phase shift and is narrower when the pump wavelength is far from the zero dispersion wavelength. The peaks of the gain will be observed at wavelengths where group velocity dispersion phase shift is compensated by the nonlinear phase shift i.e. $\Delta k=-2\gamma P$ where $\gamma$ is the nonlinear coefficient, P is the pump power and $\Delta k$ is the group velocity dispersion phase mismatch. At the same time, in linear chromatic dispersion approximation, $\Delta k \propto D_\lambda (\lambda_p-\lambda_0)(\lambda_p-\lambda_s)^2$, where $D_\lambda$ is the slope of dispersion at zero dispersion wavelength, $\lambda_p$ is the pump wavelength, $\lambda_s$ is the signal wavelength and $\lambda_0$ is the zero dispersion wavelength. The bandwidth of the parametric gain for different pump positions is represented on FIG. 7. Far from the zero-dispersion wavelength, the parametric gain has a narrow bandwidth. This fact is used in the phase insensitive design to construct a multi-wavelength clock recovery system for several channels. Each channel is used as a pump for a narrow bandwidth phase insensitive parametric process. The narrow gain from the Bragg gratings 25 or 31 insures that no significant cross talk between the extracted channels will be observed.

Referring to FIG. 6, the typical dispersion curve of the dispersion shifted highly nonlinear fiber 3 is depicted. The highly nonlinear dispersion shifted fiber 3 is designed to have a zero dispersion wavelength outside the C band (1535 nm–1570 nm) and preferably on the shorter wavelength side. The optical effect used with the fiber 3 is the four-wave-mixing based harmonic mode locking of a parametric laser in a ring cavity configuration of FIG. 1, 2, or 4. The parametric gain manifests itself when a pump and a signal are present at the input of the fiber and in particular on the input of a dispersion shifted fiber 3. Regardless of phase sensitive or phase insensitive, the efficiency of the parametric gain is related to the phase matching conditions between the signal and the pump and to the nonlinear coefficient of the fiber. The parametric gain bandwidth depends on the interplay between the phase mismatch and the nonlinear effect induced phase shift and is narrower when the pump wavelength is far from the zero dispersion wavelength. The peaks of the gain will be observed at wavelengths where group velocity dispersion phase shift is compensated by the nonlinear phase shift i.e. $\Delta k=-2\gamma P$ where $\gamma$ is the nonlinear coefficient, P is the pump power and $\Delta k$ is the group velocity dispersion phase mismatch. At the same time, in linear chromatic dispersion approximation, $\Delta k \propto D_\lambda (\lambda_p-\lambda_0)(\lambda_p-\lambda_s)$ where $D_\lambda$ is the slope of dispersion at zero dispersion wavelength, $\lambda_p$ is the pump wavelength, $\lambda_s$ is the signal wavelength and $\lambda_0$ is the zero dispersion wavelength. The bandwidth of the parametric gain for different pump positions is represented on FIG. 7. Far from the zero-dispersion wavelength, the parametric gain has a narrow bandwidth. This fact is used in the phase insensitive design to construct a multi-wavelength clock recovery system for several channels. Each cannel is used as a pump for a narrow bandwidth phase insensitive parametric process. The narrow gain from the Bragg gratings 25 or 31 insures that no significant cross talk between the extracted channels will be observed.

Figure 8:
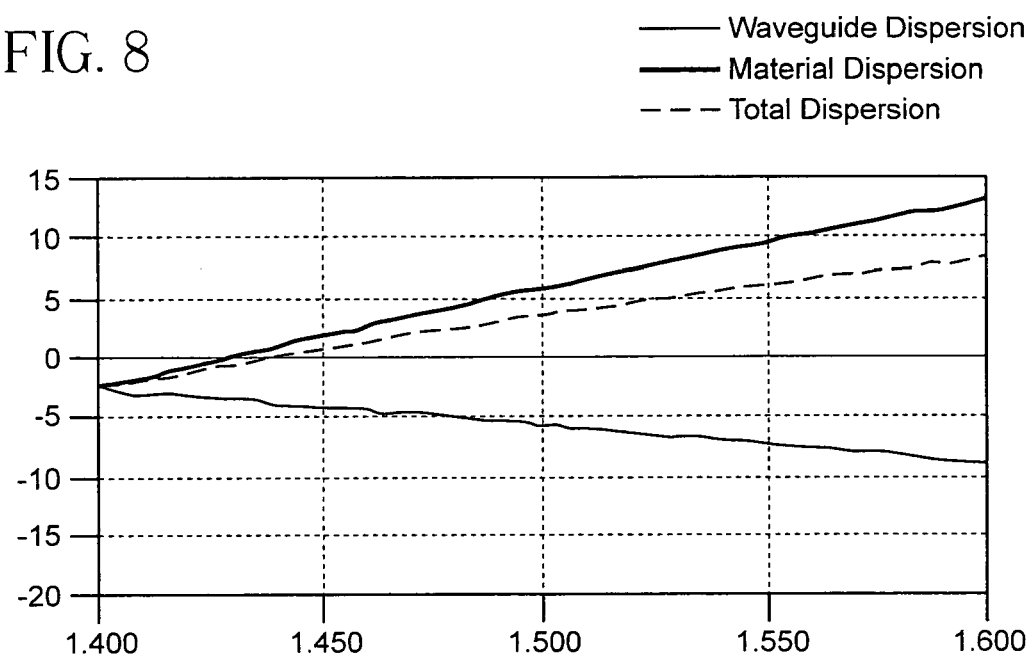
FIG. 8 is a dispersion as a function of the wavelength design chart for the fiber 3 of FIG. 1.
Figure 9:
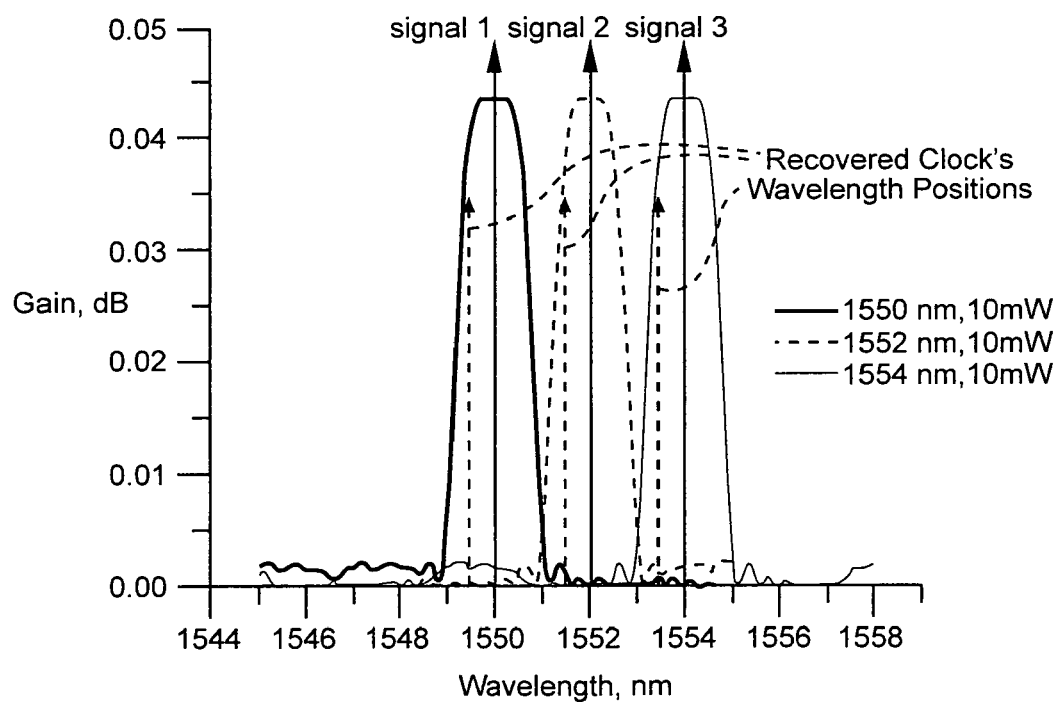
FIG. 9 displays the parametric gain bandwidth profiles excited in the fiber 3 of FIG. 1 and the channel spacing positions for the fiber 3 of FIG. 1

The preferred fiber is made by Germanium co-doping of the core region and with Fluorine co-doping of the depressed cladding region. Both Plasma Chemical Vapor Deposition (PCVD) and Modified Chemical Vapor Deposition (MCVD) methods can produce such fiber profiles. The fiber proposed is an "α-profile type fiber". The alfa values of the proposed design is α=5. The inner core radius is 2.5 µm The inner core maximal refractive index is 1.485. The depressed cladding refractive index is 1.451. The depressed cladding radius is 3 µm. The outer cladding refractive index is 1.457 at the silica level. The calculated fiber dispersion is given on FIG. 8. The zero dispersion wavelength is at 1.4415 µm. The slope of dispersion at the zero dispersion wavelength is 0.07 ps/km/nm². The effective mode field area at 1.55 µm is 15 µm².

In a practical mode-locked laser, large cavity dispersion can cause the laser output pulses to be chirped. But, this can be easily corrected by a length of a fiber with the right dispersion sign or a CFBG-based compensator.

For a multi-channel device, due to the wavelength dependence of the parametric gain, recovered clock signals of different channels will normally have different amplitudes. If desired, those amplitudes can be easily equalized by varying the reflection strength of the corresponding CFBGs.

What is claimed is:

1. An optically-pumped mode-locked fiber ring laser for optical clock recovery of multiple wavelength division multiplexed optical signals for mode-locking a plurality of outputs of the laser as a plurality of recovered clocks for a plurality of the multiple wavelength division multiplexed optical signals, the laser comprising:

a laser cavity having a cavity length corresponding to an integer multiple of bit periods of at least one of the multiplexed optical signals for receiving a pre-amplified version of the plurality of wavelength division multiplexed optical signals to provide gain modulation through a phase-insensitive parametric amplification and recirculating a proportion of the output from the laser cavity back through the laser cavity for spatially mode-locking the output of the laser cavity as a recovered clock whereby the recovered optical clock each having a periodic train of optical pulses with a repetition rate corresponding to the clock rate of the corresponding multiplexed optical signal is generated by mode-locking of the optically-pumped laser produced by a spatial modulation of the phase-insensitive parametric gain produced by the pulsed nature of the wavelength division multiplexed optical signals;

a nonlinear gain medium disposed in the cavity, the medium having a sufficiently large dispersion at all of the wavelengths corresponding to the multiple wavelength multiplexed optical signals for minimizing four-wave mixing crosstalk among the multiple wavelength multiplexed optical signals, among the recovered clocks, and between the plurality of multiple wavelength multiplexed optical signals and the recovered clocks, the gain medium pumped by the plurality of pre-amplified multiplexed optical signals to provide efficient gain modulation through the phase-insensitive parametric amplification at a plurality of narrow wavelength bands, each of the plurality of narrow wavelength bands immediately adjacent to a wavelength of a corresponding optical signal and each of the plurality of narrow wavelength bands including a corresponding recovered optical clock wavelength, and each of the corresponding optical signals copropagating in the laser cavity through the nonlinear gain medium with the recovered optical clocks;

an optical amplifier having an inhomogenously broadened gain for amplifying the plurality of recovered clocks for compensating a portion of the cavity loss at all wavelengths of the plurality of recovered clocks; and a wavelength selector for passing the light at the plurality of wavelengths of the recovered clocks for recirculation in the laser cavity and preventing the light from the multiple wavelength division multiplexed optical signals and a plurality of idler waves generated by four wave mixing between the multiple wavelength division multiplexed optical signals and recovered optical clocks from recirculating in the laser cavity.

2. The laser of claim 1, wherein the optical amplifier comprises a Raman amplifier.

3. The laser of claim 1, wherein the cavity is formed in an active mode-locking ring laser configuration.

4. The laser of claim 1, wherein the cavity is formed in a Sagnac laser configuration.

5. The laser of claim 1, wherein the wavelength selector comprises a narrow band filter.

6. The laser of claim 1, wherein the wavelength selector comprises a plurality of chirped fiber Bragg grating.

7. The laser of claim 1, wherein the wavelength selector comprises a plurality of fiber Bragg gratings for adjusting the cavity length to correspond to an integer multiple of bit periods of at least one of the multiplexed signals.

8. The laser of claim 1, wherein the wavelength selector comprises an adjustable fiber delay line for adjusting the cavity length.

9. The laser of claim 8, wherein the adjustable fiber delay line is actively stabilised.

10. The laser of claim 1, wherein the nonlinear gain medium has an appropriate dispersion slope within the cavity such that a dispersion zero wavelength is shorter than the wavelength of any of the plurality of wavelength multiplexed optical signals or the wavelengths of the recovered clocks.

11. The laser of claim 1, wherein the optical amplifier comprises a parametric amplifier.

12. The laser of claim 1, wherein the wavelength selector comprises an optical branch presenting a series of cascaded chirped fiber Bragg gratings, the optical branch being connected to the optical cavity by an optical circulator, whereby each chirped fiber Bragg grating minimizes a different idler wavelength in the cavity.

13. The laser of claim 12, wherein each chirped fiber Bragg grating is at least half as long as the physical spacing of two successive optical pulses of the plurality of wavelength division multiplexed optical signals in the cavity injected at the signal clock rate.

14. The laser of claim 1, wherein the optical amplifier comprises a Raman amplifier using the nonlinear medium of the gain modulation or another nonlinear medium as the gain medium for amplifying the plurality of the recovered clocks.

15. The laser of claim 1, wherein the wavelength selector has a free spectral range equal to the signal clock frequency or a subharmonic of the signal clock frequency for one of the plurality of wavelength division multiplexed optical signals.

16. The laser of claim 1, wherein the plurality of wavelength division multiplexed optical signals occupy respective channels separated from each other by a wavelength spacing, and the wavelength selector comprises a weak periodic filter with a free spectral range substantially equal to the wavelength spacing between adjacent channels.

17. The laser of claim 1, wherein the nonlinear medium comprises a dispersion-shifted fiber, a holey fiber or a photonic band gap fiber.

18. The laser of claim 1, further comprising:
an interleaver to couple the parametrically amplified plurality wavelength division multiplexed optical signals into the laser cavity while passing through the recovered clock signals for continued circulation in the cavity, the interleaver having the spectrally periodic design for combining odd and even numbered channels of the plurality of wavelength division multiplexed optical signals; and
a wavelength-independent coupler for splitting out a portion of light from the output of the laser to couple a corresponding plurality of recovered clocks out.

19. A method for recovery of a clock from each of a plurality of wavelength division multiplexed optical signals, the method comprising the steps of:
providing a parametric actively mode-locked fiber ring laser including a phase-insensitive optical cavity containing a gain medium;
applying the plurality of wavelength division multiplexed optical signals to the phase-insensitive optical cavity and the gain medium, thereby generating a plurality of narrow wavelength bands, each of the plurality of narrow wavelength bands being immediately adjacent to a wavelength of a corresponding wavelength division multiplexed signal and each of the plurality of narrow wavelength bands including a corresponding recovered optical clock wavelength;
optically modulating a gain in the optical path of the phase-insensitive optical cavity of the mode-locked laser; and
outputting a plurality of optical pulse streams from the phase-insensitive optical cavity, wherein the gain is modulated in response to the plurality of wavelength division multiplexed optical signals by modulating the spatial pattern of light in the phase-insensitive optical cavity thereby locking the spatial pattern of the output pulse stream to a timing wave of one of the wavelength division multiplexed optical signals.

20. A system for recovery of a clock from each of a plurality of wavelength division multiplexed optical signals, the system comprising:
a parametric actively mode-locked fiber ring laser including a phase-insensitive optical cavity containing a gain medium;
means for applying the plurality of wavelength division multiplexed optical signals to the phase-insensitive optical cavity and the gain medium, thereby generating a plurality of narrow wavelength bands, each of the plurality of narrow wavelength bands being immediately adjacent to a wavelength of a corresponding wavelength division multiplexed signal and each of the plurality of narrow wavelength bands including a corresponding recovered optical clock wavelength;
an optically controlled optical modulator in the optical path of the phase-insensitive optical cavity of the mode-locked laser; and
means for outputting an optical pulse stream from the system;
wherein the optically controlled optical modulator in response to the plurality of wavelength division multiplexed optical signals modulates the spatial pattern of light in the phase-insensitive optical cavity thereby locking the spatial pattern of the output pulse stream to a timing wave of one of the wavelength division multiplexed optical signals.

* * * * *